United States Patent [19]

Brindle et al.

[11] 4,182,307
[45] Jan. 8, 1980

[54] INFLATABLE SOLAR ENERGY COLLECTOR

[75] Inventors: Dannie K. Brindle, 12797 W. 7th Ave., Golden, Colo. 80401; Donald Y. Shanfelt, 12844 W. Iliff Ave., Lakewood, Colo. 80228.

[73] Assignees: Donald Shanfelt; Dannie K. Brindle; Dennis D. Kiser; David W. Armagast; Patrick J. Lynch, ; part interest to each

[21] Appl. No.: 884,418

[22] Filed: Mar. 8, 1978

Related U.S. Application Data

[63] Continuation-in-part of Ser. No. 817,992, Jul. 21, 1977.

[51] Int. Cl.$^2$ .............................................. F24J 3/02
[52] U.S. Cl. ................................... 126/432; 165/46; 165/83; 126/428
[58] Field of Search ............... 126/270, 271; 237/1 A; 165/46, 83

[56] References Cited

U.S. PATENT DOCUMENTS

| | | | |
|---|---|---|---|
| 3,859,980 | 1/1975 | Crawford | 126/271 |
| 3,908,631 | 9/1975 | Rom | 126/270 |
| 4,015,586 | 4/1977 | Vroom et al. | 126/270 |
| 4,027,437 | 6/1977 | Monsky | 126/270 |
| 4,031,674 | 6/1977 | Rand | 126/270 |
| 4,051,833 | 10/1977 | Vandament | 126/270 |

*Primary Examiner*—Samuel Scott
*Assistant Examiner*—Daniel J. O'Connor

*Attorney, Agent, or Firm*—John R. Ley

[57] ABSTRACT

An inflatable solar energy collector utilizes flexible materials and is adapted to be inflated by a flow of pressurized gas therethrough. Inflation positions a solar energy collecting panel at an appropriate predetermined angle for effectively collecting solar energy. The solar collector includes an enclosure defining a generally tubular configuration, and the energy collecting panel extends in a planar and chord-like manner through the interior of the enclosure. Wall portions of the enclosure comprise solar radiation transparent material to allow incident solar radiation to pass therethrough onto the energy collecting panel. A second panel of solar radiation transparent material is operatively sealed to the energy collecting panel in selected positions to define a gas conducting conduit extending over the energy collecting panel. A flow of pressurized gas is conducted into the gas conducting conduit and removes the solar radiation absorbed by the energy collecting panel in the form of heat. Means conducts pressurized gas from the gas conducting conduit into the interior of the enclosure for inflating the collector and positioning the energy collecting panel at the optimum angle for absorbing incident solar radiation. Attaching means are positioned at the exterior of the enclosure for selectively attaching the enclosure to a support surface in a desired manner whereby the energy collecting panel is optimally angled upon inflation of the collector.

16 Claims, 7 Drawing Figures

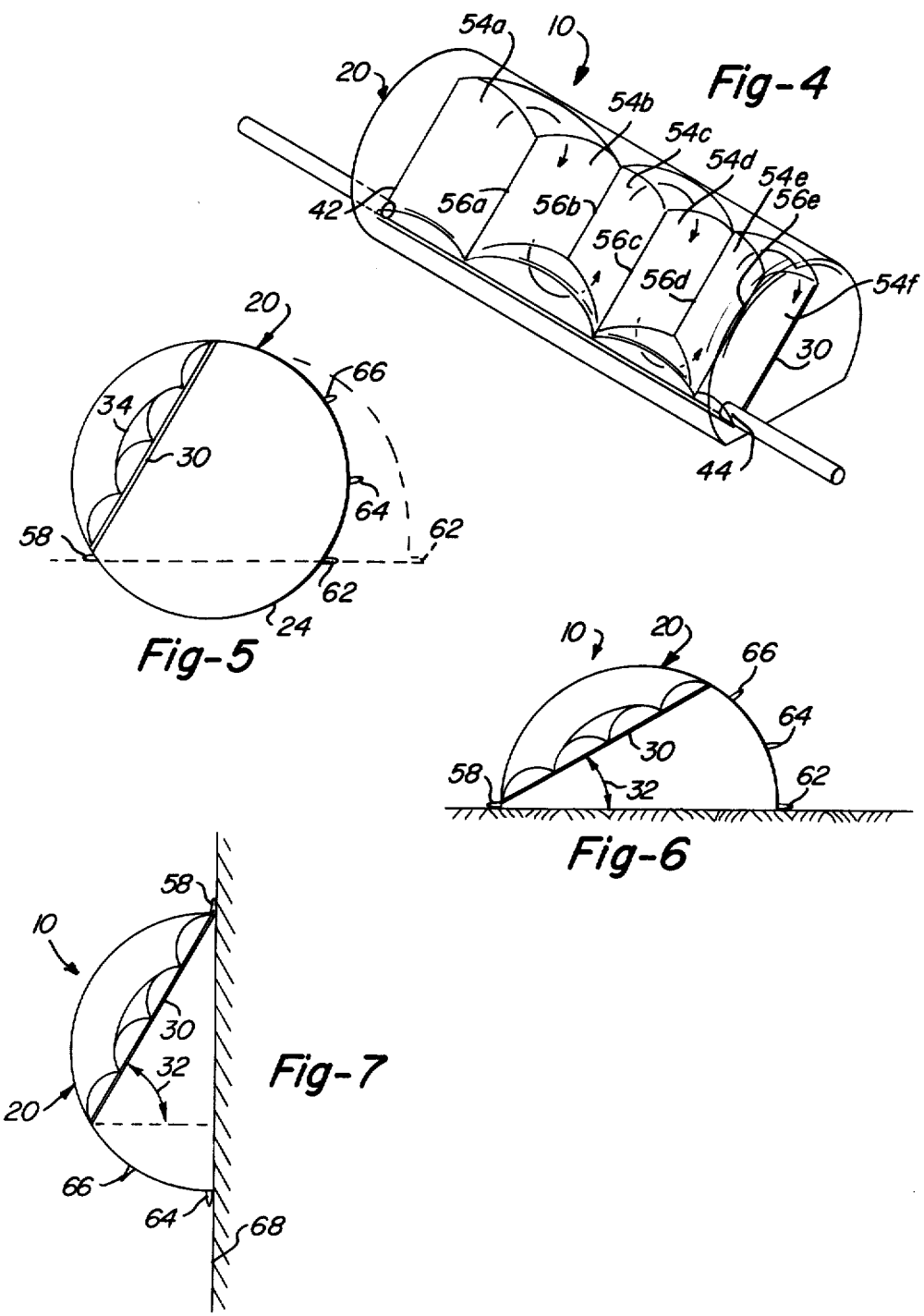

INFLATABLE SOLAR ENERGY COLLECTOR

CROSS REFERENCE TO RELATED APPLICATION

This is a continuation-in-part of application Ser. No. 817,992, filed July 21, 1977 for an Inflatable Solar Heat Collector.

BACKGROUND OF THE INVENTION

1. Field of the Invention

This invention relates to the collection of solar radiant energy, and more particularly to a new and improved inflatable and flexible solar energy collector.

2. Brief Discussion of Prior Art

Various forms and arrangements of inflatable solar energy collectors are known in the art. Examples of various flexible inflatable solar energy collectors are disclosed in U.S. Pat. Nos. 2,022,781, 3,125,091, 3,337,418, 3,453,666, 3,859,980 and 3,908,631, and British Pat. No. 1,161,887 (1969).

A significant portion of the prior art collectors made of flexible materials and adapted to be inflated by fluid are arranged to conduct water or liquid fluid therethrough to absorb heat created by the solar energy collected. These inflatable solar collectors are widely used in heating water, typically for swimming pools, however some inflatable solar collectors have been employed for distilling sea water or other fluids. In these types of collectors, a supporting structure must typically support the collector due to the weight of the fluid conducted through it. This supporting structure, being permanent or complex in arrangement, limits the conditions of effective use of collectors made of flexible material.

A few of the inflatable flexible collectors utilize pressurized gas flow therethrough for various purposes, and still others employ both liquids and gases when used. In each case, limited efficiency and usefulness has resulted from the limitations inherent in prior art inflatable flexible solar energy collectors. Significant in the prior art are limitations in the positioning of the energy collecting elements and limitations in the type of and provision for fluid flow through the inflatable collector to allow maximum usage and efficiency in a variety of new or worthwhile applications.

Limitations and disadvantages of conventional inflatable solar energy collectors other than those briefly discussed here may be known or should become apparent upon recognition of the advantages secured by the present invention, particularly since many of the prior art limitations and disadvantages can be avoided or overcome, and many of the advantages previously unattainable can be obtained, as a result of the present invention.

OBJECTS AND SUMMARY OF THE INVENTION

It is the general objective of this invention to provide a new and improved inflatable solar energy collector constructed of flexible and inexpensive materials which greatly increases the efficiency of solar radiation energy collection as compared to prior art inflatable solar energy collectors. It is another objective of this invention to provide an inflatable solar energy collector providing a number of advantageous conditions of use under a wide variety of different or varying situations and adaptations. It is another objective of this invention to provide an inflatable flexible solar energy collector which allows selection of the most advantageous position for use in different geographic locations and at different times of the year. A further objective of the invention is to provide a relatively inexpensive flexible solar energy collector providing an efficiency similar to the more expensive and complex solar collectors of a rigid construction. Still a further objective of the invention is to provide a solar energy collector which can be effectively utilized for heating dwelling homes, and in such application, provides the desirable advantages of reduced cost in obtaining the collector or in adapting the collector for use in the dwelling home; of simplicity in use, care, repair, storage, movement, adjustment, and removal; and of simple and rapid adaption to a significant number of existing heating systems or energy storage and utilization systems.

In accordance with these objectives and with the general aspects of the invention, the inflatable solar energy collector comprises an enclosure or closed housing member generally defining a tubular configuration and having an interior volume into which an energy collecting panel is operatively connected. Upon inflatation of the enclosure by a flow of pressurized gas therethrough, the energy collecting panel is positioned in an essentially planar and chord-like manner across the interior of the enclosure. Front wall portions of the enclosure are comprised of solar radiation transparent material to allow incident solar radiation to fall upon the energy collecting panel. The enclosure is selectively attached to a supporting surface by attachment means which operatively position the energy collecting panel at a predetermined acute angle with respect to a horizontal reference. The predetermined acute angle is that angle which results in optimum and efficient absorption of solar energy. The means for attaching the enclosure to a supporting surface allows the selective adjustment of the angle of the energy collecting panel for best conditions of use in a variety of different situations, applications and positions. The selective attaching means may comprise a plurality of fastening means operatively attached to the exterior of the enclosure whereby the housing member is connected to the supporting surface. At least one flexible panel member operatively associated with the energy connecting panel defines a gas conducting conduit extending in heat conducting relationship over the energy collecting panel. A flow of gas through the gas conducting conduit inflates the collector, operatively positions the energy collecting panel, and removes collected solar energy in the form of heat.

A more complete understanding of the invention can be obtained from the appended claims, and from the following description of presently preferred embodiments of the invention taken in conjunction with a drawing consisting of a number of figures.

BRIEF DESCRIPTION OF THE DRAWINGS

FIG. 4 is a schematic illustration of another embodiment of an inflatable solar energy collector related to that collector illustrated in FIG. 1, and FIG. 4 illustrates an alternative arrangement of certain elements of the solar energy collector.

FIG. 5 is a schematic view of a collector similar to that shown in FIG. 1, generally illustrating the manner of deflection of the solar collector in a hypothetically inflated condition when attached to a horizontal supporting surface.

FIG. 6 is a schematic view similar to FIG. 5 illustrating attachment of the solar collector to a horizontal supporting surface.

FIG. 7 is a schematic view similar to FIG. 5 illustrating attachment of the solar collector to a vertical supporting surface.

DESCRIPTION OF PREFERRED EMBODIMENTS

Figure 1:
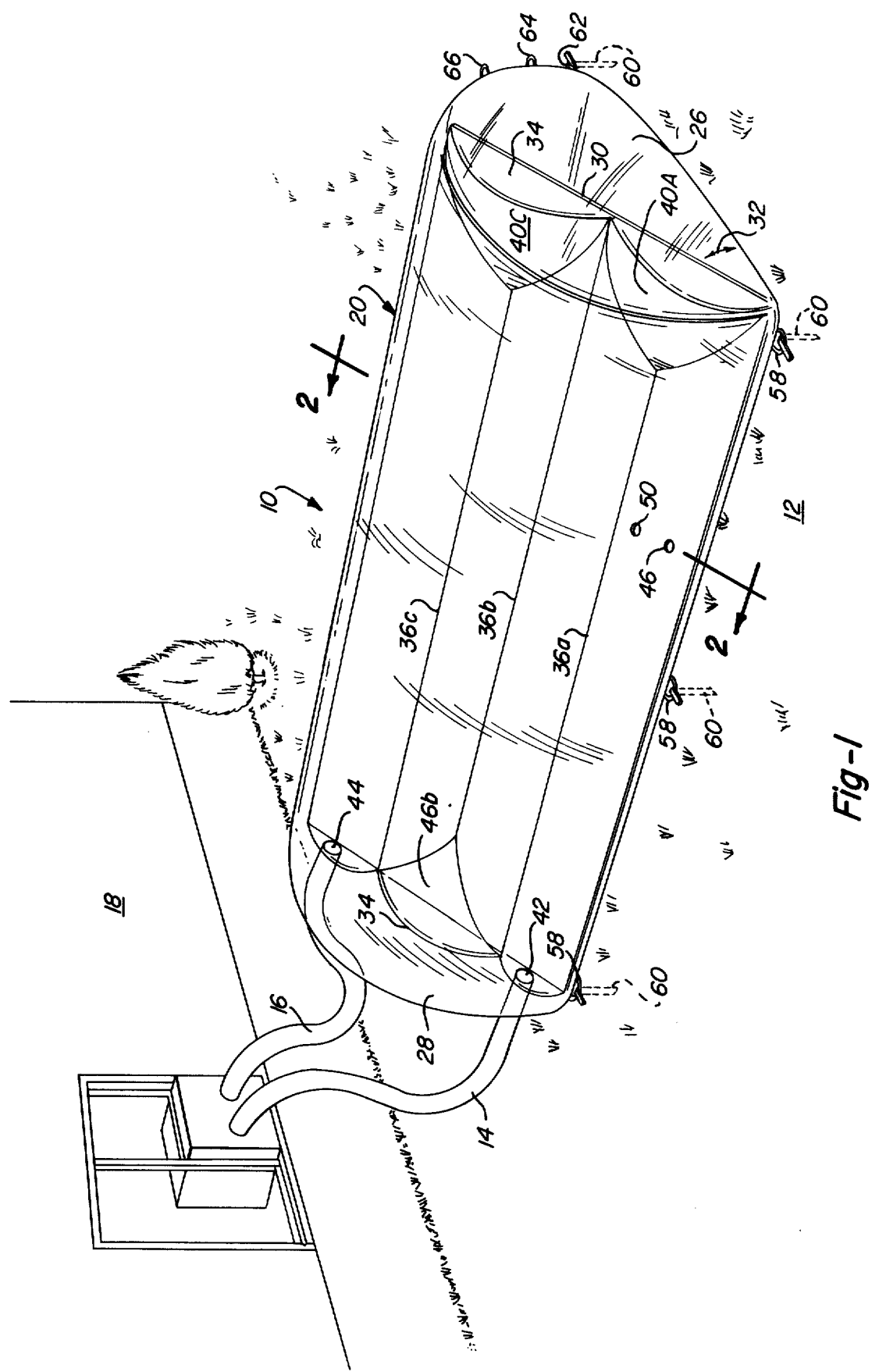
FIG. 1 is a perspective view of one embodiment of an inflatable solar energy collector of the present invention, and generally illustrates use of the collector for supplying heated air flow to a dwelling house.

An inflatable solar energy collector 10 comprising a plurality of elements, many of which utilize clear flexible materials, is illustrated in FIG. 1. The collector 10 is adapted to be positioned on a supporting surface, such as a ground surface 12. A flow of pressurized gas is delivered from a conventional source (not shown) through a conduit 14 to the collector 10. The flow of pressurized gas is operative to inflate the solar collector 10, and energy collected by the collector 10 is transferred in the form of heat to the flow of gas as the gas is conducted through the collector. The heated flow of gas is conducted out of the collector 10 by a conduit 16, and is transferred to a location for use, such as a dwelling house 18.

Figure 2:
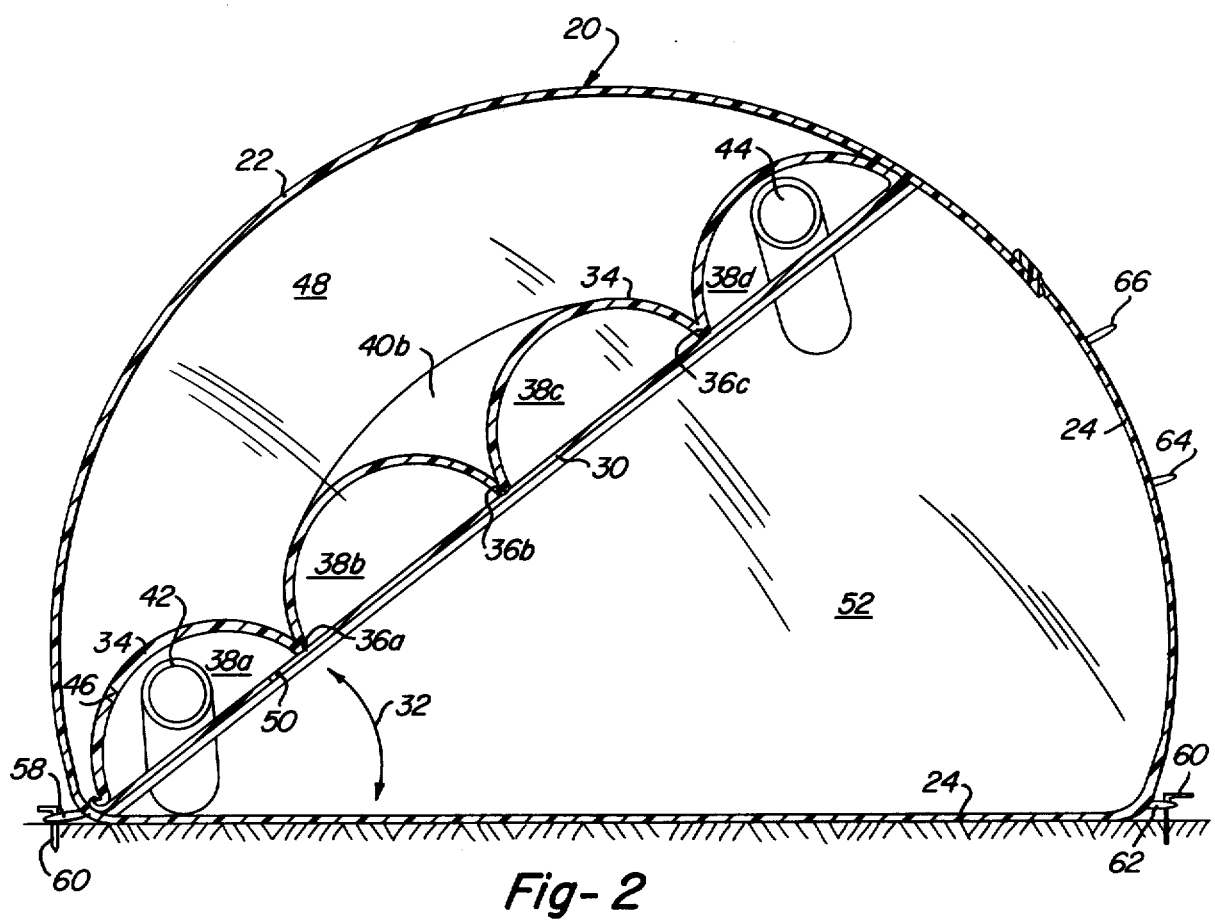
FIG. 2 is a vertical section view taken substantially in the plane of line 2—2 of FIG. 1.

The solar energy collector 10 includes an enclosure or a closed housing member 20 formed preferably of clear flexible plastic material. The housing member 20 generally defines an elongated tubular configuration, as is best shown in FIGS. 1 and 2. The housing member 20 includes front and rear wall portions 22 and 24 (FIG. 2) respectively, and the opposite ends of the housing member are closed by end wall portions 26 and 28 (FIG. 1). The upwardly and outwardly facing front wall portion 22 is constructed of solar radiation energy transparent material to allow incident solar radiation to pass into the interior volume defined by the closed housing member 20. The rear wall portion 24 and the end wall portions 26 and 28 may also be constructed of solar radiation energy transparent material if desired, although such construction is not necessarily required.

To receive the incident solar radiation conducted through the radiation transparent front wall 22, an energy collecting panel 30 is operatively positioned within the interior volume of the housing member 20. The energy collecting panel 30 is formed of solar radiation absorbing material, and is preferably black plastic flexible material. Upon inflation of the solar collector 10, the energy collecting panel 30 is positioned at a predetermined acute angle 32 with respect to a horizontal reference. The predetermined acute angle 32 is optimally determined for efficiently absorbing solar radiation energy and the value of the angle 32 is primarily determined in accordance with the latitude where the solar collector 10 is utilized. Certain other considerations such as the seasons of the year and the direction in which the energy collecting panel 30 faces, may be of importance in determining the acute angle 32. The radiation transparent front wall portion 22 extends outward from and substantially over the total area of the energy collecting panel 30, thereby exposing substantially all of the panel 30 to incident solar radiation. The longitudinal edges of the energy collecting panel 30 are secured or sealed to the interior of the housing member 20 at the point of the housing member where the front and rear wall portions 22 and 24 joint another. The transverse end edges of the energy collecting panel 30 are preferably sealed to the end wall portions 26 and 28 of the housing member, although the energy collecting panel need not extend longitudinally from one end wall portion 26 or 28 to the other end wall portion if desired. Upon inflation of the collector, the energy collecting panel extends in a chord-like manner transversely through the interior of the housing member 20. It should be appreciated that some limited billowing or bowing of the panel 30 can occur after inflation, but the general and overall configuration of the panel is somewhat planar as a result of the rigidity supplied by the inflated housing member.

To operatively define a gas conducting conduit extending over a substantial portion of the energy collecting panel 30, a second panel 34 is provided. The second panel 34 is formed of flexible solar radiation transparent material, and is positioned intermediate the energy collecting panel 30 and the front wall portion 24 of the housing member. The second panel 34 is operatively sealed to the longitudinal and transverse edges of the energy collecting panel 30. Additionally, the second panel 34 is sealed to the energy collecting panel at a plurality of longitudinally extending sealing zones 36a, 36b and 36c. Sealing zone 36a and 36c extend longitudinally from one transverse end edge of the energy collecting panel and terminate longitudinally short of the other transverse end edge. Sealing zone 36b is intermediate zones 36a and 36c and extends longitudinally from the other transverse end edge of the energy collecting panel and terminates longitudinally short of the end edge from which sealing zone locations 36a and 36b begin. As a result, conduit portions 38a, 38b, 38c and 38d (FIG. 2) are defined intermediate the sealing zones 36a, 36b and 36c by segments of the panels 30 and 34 between the sealing zones. The conduit portions are operatively connected together by end portions 40a, 40b and 40c (FIG. 1) of the panel 34. End portion 40a connects the conduit portions 38a and 38b at their ends adjacent the end wall 26. The termination of the sealing zone 36a short of the end wall 26 provides the end connection of conduit portions 38a and 38b. Similarly, end portion 40b connects the ends of conduit portions 38b and 38c adjacent the end wall 28, and end portion 40c connects the ends of conduit portions 38c and 38d adjacent the end wall 26. Thus, the conduit portions 38a, 38b, 38c and 38d are connected serially in a reversing tortuous path and define a gas conducting conduit extending substantially over the total area of the energy collecting panel 30.

Upon introduction of a flow of gas through the gas conducting conduit formed of portions 38a, 38b, 38c and 38d, the solar energy collected by the energy collecting panel 30 is transferred in the form of heat to the gas flowing through the gas conducting conduit. To supply a flow of pressurized gas to the gas conducting conduit, an inlet opening 42 extends through the housing member 20 into communication with one end of the gas conducting conduit. The inlet 42 is connected with the conduit 14 extending from the dwelling house 18. To remove the flow of gas from the gas conducting conduit and thereby establish gas flow therethrough, an outlet 44 is connected in communication with the other end of the gas conducting conduit. Preferably, the outlet 44 extends through the housing member 20 and is connected for directly removing the supply of heated gas from the other end of the gas conducting conduit after heat energy has been transferred to the gas during passage over the energy collecting panel 30.

To inflate the tubular housing member 20, at least one gas passageway operatively extends from the gas conducting conduit into the interior volume of the housing member. If the energy collecting panel 30 is operatively sealed within the interior of the housing member to divide the interior into two separate portions, a passageway must extend from the gas conducting conduit to each of the separate interior volume portions. Shown in FIGS. 1 and 2, a passageway 46 extends through the second panel 34 from the conduit portion 38a to allow inflation of a front chamber 48 between the second panel and the front wall portion 22 of the housing member 20. A second passageway 50 extends through the energy collecting panel 30 from the conduit portion 38a to allow inflation of a rear chamber 52 intermediate the rear wall portion 24 and the energy collecting panel. A supply of pressurized gas is provided in the front and rear chambers 48 and 50 respectively from the flow of pressurized gas flowing through the gas conducting conduit. Gas flows into the front and rear chambers until they are inflated and thereafter the gas flow terminates and the gas pressure within the front and rear chambers maintains the housing member 20 in a sufficiently rigid condition to position the energy collecting panel 30 in the manner described. The pressure within the interior volume of the housing member gives the energy collecting panel 30 sufficient rigidity to maintain its generally planar configuration oriented at the angle 32 for effectively collecting solar radiant energy. Since the passageways 46 and 50 extend from the gas conducting conduit into the chambers 48 and 52, it is apparent that the pressure in the front and rear chambers is approximately equal. The equal pressure aids in maintaining the generally planar configuration of the energy collecting panel.

If the energy collecting panel 30 terminates longitudinally short of one or both housing end wall portions 26 and 28, the interior volume will not be divided into the separate front and rear chambers 48 and 52, respectively. Instead, the panel 30 will extend only partially longitudinally through the interior volume of the housing member, and only one passageway from the gas conducting conduit will be required to inflate the interior volume of the housing member. Once the housing member 20 has been inflated, the pressurized gas within the interior volume does not return or flow into the gas conducting conduit. Instead, the gas in chambers 48 and 52, for example, is in a static pressurized condition. The pressurized gas within the interior volume contacts the panels 30 and 34 and acts as an insulation barrier to the ambient environment. As a result of this insulation barrier of gas around the gas conducting conduit, less heat energy is lost to the ambient environment and more heat energy is removed from the collector. In the embodiment illustrated, the front wall portion 22 could be eliminated if the energy collecting panel would maintain its generally planar relationship oriented at the angle 32 under the influence of pressure within the rear chamber. Of course, eliminating the front wall portion 22 loses the insulating advantages of the static gas in the front chamber.

An alternative arrangement for the gas conducting conduit is generally illustrated in FIG. 4. The gas conducting conduit is formed in a plurality of upward extending conduit portions 54a, 54b, 54c, 54d, 54e and 54f. The upward extending conduit portions are formed by sealing the second panel 34 to the energy collecting panel 30 at a plurality of upward extending sealing zones 56a, 56b, 56c, 56d and 56e extending in a transverse direction alternately from opposite longitudinal edges of the energy collecting panel. Of course, the second panel 34 is operatively sealed to the exterior edges of energy collecting panel in a manner similar to that previously described. The ends of the conduit portions 54a to 54f are operatively connected by the second panel and sealing zones, similarly to the arrangement previously described, to serially connect conduit portions in a reversing tortuous path. The inlet 42 and outlet 44 are operatively connected for communication with the opposite terminal ends of the gas conducting conduit. The conduit portions 54a to 54f, when inflated, further resist downward deflection or bowing of the energy collecting panel 30. The resistance is provided by the reinforcement inherent in the inflated and bowed conduit portions extending transversely of the longitudinal dimension of the energy collecting panel. The gas conducting conduit extends substantially over the total area of the energy collecting panel and provides for the removal of collected solar energy in the form of heat by the flow of pressurized gas thereover.

Figure 3:
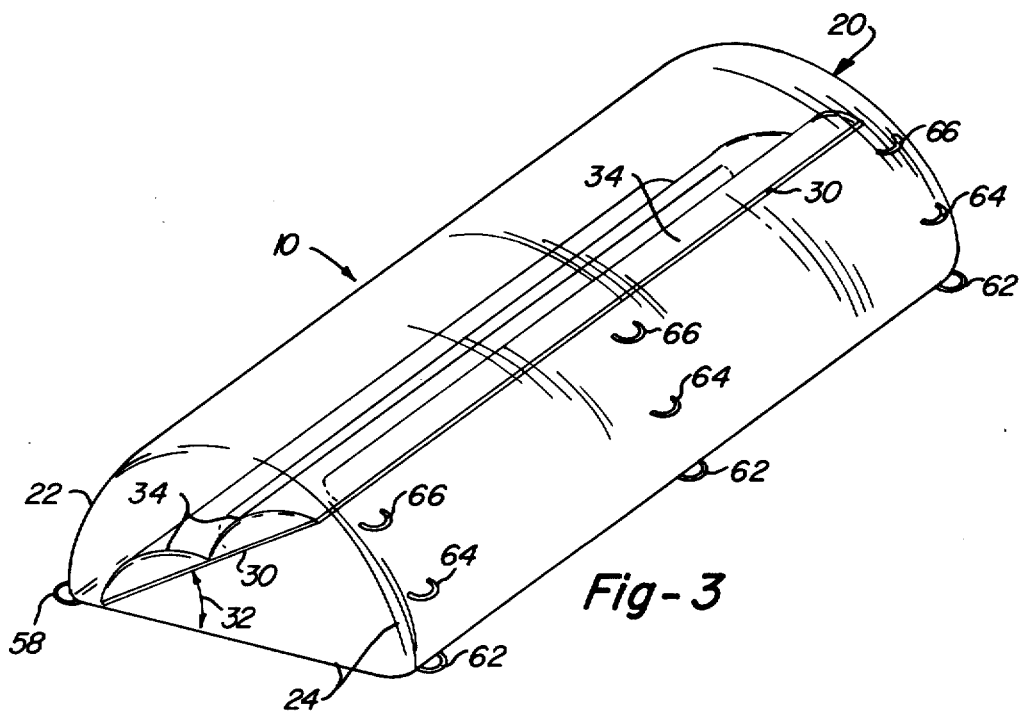
FIG. 3 is a perspective view of the inflatable solar energy collector shown in FIG. 1, viewed rearwardly with respect to the view of FIG. 1.

A plurality of fastening means operatively attach the housing member 20 to a support surface and thereby operatively position the energy collecting panel 30 at the predetermined acute angle 32 for optimally absorbing solar radiant energy, upon inflation of the housing member. The fastening means preferably take the form of a plurality of loop members operatively connected to the external surface of the housing member 20, as is best seen in FIGS. 1, 2 and 3. A first group of loop members 58 extend from the housing member at a position adjacent the connection of the lower longitudinal edge of the energy collecting panel 30 to the interior of the housing member. Stakes 60 or other suitable retention means fasten the loop members 58 to the ground 12 as shown in FIG. 1. The loop members 58 position one longitudinal edge of the energy collecting panel 30 adjacent the support surface.

One group of a plurality of groups of loop members attach the rear wall portion 24 to the support surface, and thereby retain the housing member 20 whereby the energy collecting panel 30 is positioned at an appropriate acute angle. To selectively adjust the acute angle of the energy collecting panel, one group of the plurality of groups of fastening means is attached to the support surface. The group of loop members 62 is attached in a longitudinal row essentially parallel to the loop members 58 and is operative to position the energy collecting panel at the greatest acute angle 32 with respect to horizontal reference. The loop members 62 may be attached to the ground surface 12 by stakes or other retention means. The group of loop members 64 is also positioned in a longitudinal row extending parallel to the rows of loop members 58 and 62. The row of loop members 64 is circumferentially spaced toward the connection of the upper edge of the energy collecting panel 32 to the housing member 20, from the row of loop members 62. The third group or row of loop members 66 is positioned circumferentially spaced from the row of loop members 64 toward the connection of the upper edge of the energy collecting panel 30 to the interior of the housing member. The longitudinal row of loop members 66 is also parallel to the rows of loop members 58, 62 and 64. By attaching one of the groups of loop members 62, 64 or 66 to the support surface, the angle of the energy collecting panel with respect to the support surface can be selectively varied. For example, in FIG. 2, the maximum acute angle with respect to a horizontal is secured by fastening loop members 58 and 62 to the ground 12. Progressively lesser acute angles with respect to a horizontal are secured by fastening the group of loop members 64 and the group of loop members 66 to the support surface.

FIG. 5 schematically illustrates the manner of deflection of the rear wall portion 24 of the housing member upon attachment of the collector 10 to a supporting surface. The housing member 20 is illustrated schematically as an inflated tubular configuration which is deflected upon attachment, although typically the collector will be attached to the support surface before being inflated.

By provision of a plurality of circumferentially spaced and longitudinally extending rows of loop members 62, 64 and 66, the energy collecting panel can be effectively angled with respect to a variety of different support surfaces. Use on a horizontal support surface has previously been described and is shown schematically in FIG. 6. FIG. 7 illustrates attachment of the solar collector 10 on a vertically extending support surface 68. In the situation in which collector 10 is attached to a vertical surface 68, the row of loop members 64 operatively positions the energy collecting panel 30 at the optimum acute angle 32 with respect to a horizontal reference.

The number of groups of loop members attached to the rear wall portion 24 can be varied depending on the desired angular increments desired. By providing a sufficient number of loop members attached to the rear wall portion, the collector can be positioned on a variety of differently angled support surfaces with the energy collecting panel oriented at the optimum angle 32. The groups of loop members on the rear wall of the collector may be appropriately coded in a manner to inform the user of the operative angle at which the energy collecting panel will be positioned when the collector is inflated. Arranged in this manner, the angle of the solar energy collecting panel may be readily adjusted to achieve a desired condition for maximum collection of radiant solar energy.

To utilize the solar energy collector 10, the group of fastening means 58 is attached to a support surface. The loop members are attached in a row generally perpendicularly with respect to the desired direction which the energy collecting panel is to face. One of the groups of fastening means 62, 64 or 66 is selected to provide the desired angle 32 of inclination of the energy collecting panel 30 with respect to a horizontal reference. The selected group of loop members 62, 64 or 66 is then attached to the support surface. The conduits 14 and 16 are connected to the inlet and outlet means 42 and 44 respectively, and a supply of pressurized gas is conducted from the conduit 14 into the collector. The supply of pressurized gas begins inflating the solar energy collector. The supply of pressurized gas inflates the second panel above the energy collecting panel and thereby defines the gas conducting conduit over the energy conducting panel. The pressurized gas flows through the gas conducting conduit and out the outlet means 44 through the conduit 16. The passageways 46 and 50 admit a supply of pressurized gas into the front and rear chambers 48 and 52 respectively. The pressurized gas flows through the passageways 46 and 50 until the front and rear chambers reach their maximumly inflated condition, at which point the flow of gas into the front and rear chamber terminates as a result of the housing member being a sealed enclosure. The pressure of the gas within the front and rear chambers is maintained by the communication opening through the passageways 46 and 50 to the supply of pressurized gas flowing through the gas conducting conduit. Under the conditions of maximum inflation of the front and rear chambers, the inflated housing member 20 provides sufficient rigidity for orienting the energy collecting panel 30 in a generally planar relationship at the predetermined angle 32 with respect to a horizontal reference. The orientation of the energy collecting panel with respect to a horizontal reference assures a high efficiency in solar radiation energy collection. As compared to prior art inflatable collectors in which the solar collecting element is positioned generally horizontally, optimum angular orientation of the energy collecting panel 30 may increase the efficiency of solar energy collection by up to seventy-five percent. The flow of pressurized gas through the collector serves the two purposes of removing the collected radiant solar energy as heat and inflating the collector 10 to provide sufficient rigidity and orientation for efficient energy collection.

The supply of pressurized gas to the collector 10 may be obtained from a forced air heating system typically employed in many dwelling houses. Alternatively, a separate fan arrangement can supply pressurized gas to the collector and remove the heated gas from the collector. An appropriate valve arrangement may be utilized for supplying the heated flow of air from the collector directly into the heating system of the dwelling house. Similarly, the valving arrangement may terminate the supply of air to the collector during cloudy days or other times when insufficient solar radiant energy can be collected. When the collector is inoperative, it will gradually collapse to a deflated condition and thereby significantly reduces its exposure to wind and other elements. Being formed of flexible materials, the potential for damage or destruction to the collector is minimized. The relatively inexpensive materials from which the collector is conveniently fabricated reduce the cost of the solar collector to a small fraction of the cost of the more expensive collector fabricated of rigid materials. The collector 10 may be readily deflated and stored when not in use by folding the flexible materials into a bundle and removing the collector from its position of use. Similarly, the collector may be oriented to face in a variety of different directions by removing the fastening means from the supporting surface and reorienting the collector to face in a new direction. These advantages demonstrate that a new and significantly improved solar energy collector has been provided in accordance with the concepts of the present invention.

Although the present invention has been described with a certain degree of particularity, it is understood that the present disclosure has been made by way of example and that changes in details of structure may be made without departing from the spirit and scope of the invention.

We claim as our invention:

1. An inflatable solar energy collector adapted to be positioned on a supporting surface and to be inflated by a flow of pressurized gas therethrough, said collector being operative to collect solar energy and transfer a substantial portion of the energy collected to the gas flowing therethrough, comprising:
   a closed housing member generally defining a tubular structure having an interior volume, said housing member comprising flexible material and having a front portion thereof comprising solar radiation transparent material;
   an energy collecting panel comprising solar energy absorbing flexible material, said energy collecting panel being operatively connected within the interior volume of said housing member, said energy collecting panel operatively extending in a planar and chord-like manner across the interior of said housing member facing the front portion of said housing member;
   means operatively associated with said energy collecting panel for defining a gas conducting conduit over a substantial part of said energy collecting panel, said conduit defining means comprising flexible material; and
   means associated with said housing member for attaching said housing member to a supporting surface and operatively positioning said energy collecting panel at a predetermined acute angle with respect to a horizontal reference, whereby said energy collecting panel efficiently absorbs solar energy upon inflation of said housing member.

2. A solar collector as recited in claim 1:
   wherein said energy collecting panel is operatively sealed to the housing member to divide the interior volume of said housing member into two separate interior portions; and
   further comprising one gas passageway operatively extending from the gas conducting conduit into each of the two separate interior portions.

3. A solar collector as recited in claim 2 further comprising:
   inlet means for directly admitting a flow of gas into the gas conducting conduit, said inlet means being operatively associated with said conduit defining means; and
   outlet means for directly removing a flow of gas from the gas conducting conduit, said outlet means being operatively associated with said conduit defining means.

4. A solar collector as recited in claim 3 wherein:
   said inlet and outlet means extend through said housing member into direct communication with the gas conducting conduit, and the gas conducting conduit extends essentially serially between said inlet and outlet means.

5. A solar collector as recited in claim 1 wherein:
   said energy collecting panel is operatively sealed to the housing member to define the interior volume of said housing member into two separate interior portions; and
   said conduit defining means further comprises a flexible panel of solar energy transparent material operatively sealed at a plurality of selected locations to said energy collecting panel, said second panel being positioned intermediate said energy collecting panel and the front portion of said housing member, said second panel and said energy collecting panel and the operative sealed locations therebetween defining at least one gas conducting conduit, the majority of the area of said energy collecting panel being in heat conducting relationship with at least one gas conducting conduit.

6. A solar collector as recited in claim 5 further comprising:
   a passageway extending through said energy collecting panel, and
   a passageway extending through said second panel.

7. A solar collector as recited in claim 6 wherein said second panel extends substantially over the total area of said energy collecting panel.

8. A solar collector as recited in claim 7:
   wherein said energy collecting panel and said second panel and the operative sealed locations therebetween define one gas conducting conduit extending substantially over the total area of said energy collecting panel;
   further comprising inlet means for directly admitting a flow of gas into the gas conducting conduit, and outlet means for directly removing a flow of gas from said gas conducting conduit; and
   wherein said inlet and outlet means directly communicate with opposite ends of the gas conducting conduit through the housing member.

9. A solar collector as recited in claim 1 wherein said conduit defining means comprises:
   a flexible second panel of solar energy transparent material operatively sealed at a plurality of upward extending locations to said energy collecting panel, said second panel being positioned intermediate said energy collecting panel and the front portion of the housing member, the second panel and the energy collecting panel and the upward extending operative sealed locations therebetween defining at least one upward extending gas conducting conduit.

10. A solar collector as recited in claim 1 wherein said attaching means is selectively adjustable to selectively position said energy collecting panel at a plurality of predetermined acute angles with respect to a horizontal reference.

11. A solar collector as recited in claim 10 wherein said selectively adjustable attaching means comprises:
    first fastening means operatively attached to said housing member externally adjacent the position of connection of said energy collecting panels to the interior of said housing member; and
    second fastening means operatively externally attached to the opposite side of said housing member from said first fastening means, said second fastening means operatively positioning said energy collecting panel at a predetermined acute angle with respect to a supporting surface and positioning the front portion of said housing member in an upward and outward facing orientation upon inflation of said housing member.

12. A solar collector as recited in claim 11 wherein:
    said second fastening means comprise a plurality of second fastening members, at least a few of said plurality of fastening members being circumferentially spaced along the housing member with respect to one another.

13. A solar collector as recited in claim 11 wherein:
    the portion of said housing member other than the front portion defining a rear portion;
    the first fastening means are positioned longitudinally along the exterior of said housing member at positions generally parallel to the position at which one longitudinal edge said energy collecting panel is connected to the interior of said housing member; and said second fastening means comprises a plurality of groups of second fastening members, each group of second fastening members is longitudinally positioned along the exterior of the rear portion of said housing member at positions generally parallel with respect to the longitudinal positionment of said first fastening means, each group of second fastening members being spaced circumferentially of the housing member with respect to an adjacent group of second fastening members.

14. A solar collector as recited in claim 13 wherein the fastening means comprise loop members operatively extending from the exterior of said housing member.

15. A solar energy collector as recited in claim 1 further comprising:
means operatively connected in communication with the interior volume of said housing member for supplying inflating gas thereto.

16. A solar energy collector as recited in claim 15 wherein said inflating gas supplying means comprises:
at least one communication passageway extending from said gas conducting conduit defining means.

* * * * *